United States Patent Office.

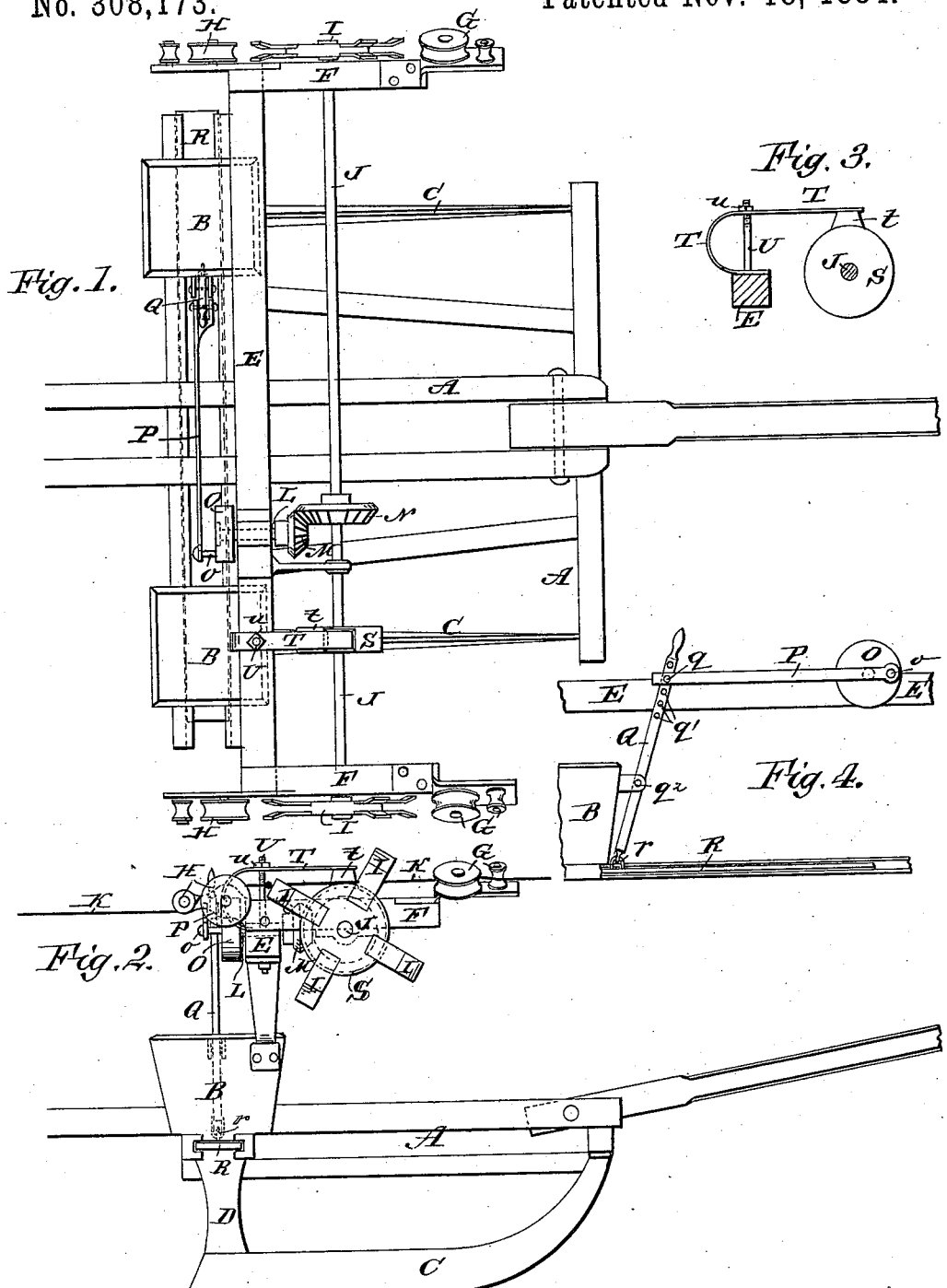

JOEL KIRKWOOD, OF MAUZY, INDIANA.

CHECK-ROW CORN-PLANTER.

SPECIFICATION forming part of Letters Patent No. 308,173, dated November 18, 1884.

Application filed June 2, 1884. (No model.)

*To all whom it may concern:*

Be it known that I, JOEL KIRKWOOD, of Mauzy, in the county of Rush and State of Indiana, have invented a new and Improved Check-Row Corn-Planter, of which the following is a full, clear, and exact description.

The object of my invention is to provide a simple, efficient, and durable machine for planting corn or other seeds in accurate check-row.

The invention consists in the construction and arrangement of parts, as will be hereinafter fully described and claimed.

Reference is to be had to the accompanying drawings, forming part of this specification, in which similar letters of reference indicate corresponding parts in all the figures.

Figure 1 is a plan view of my improvement as applied to a corn-planter. Fig. 2 is a side elevation thereof. Fig. 3 is a side view of the friction-brake device of the forked wheels, which are operated by the knotted cord; and Fig. 4 is a rear view showing the connections for driving the seed-dropping slide.

The letter A indicates a suitable frame, which carries the seed-boxes B B, one at each side of the machine, and the runners C C for opening the furrows to receive the seed, the runners connecting by spouts or conduits D in any approved way with the boxes.

E is a cross-bar connected to the seed-boxes or frame and carrying at its opposite ends the bars F F, which range lengthwise and carry the forward inclined wire or cord take-up rollers, G G, and the rear paying-out rollers, H H.

Between the pairs of rollers G H are placed the forked four-armed wheels I, which are fixed on the opposite ends of a shaft, J, journaled in bearings fixed to the bars F, and are operated by the knots of the drop-cord K in the usual manner.

In bearings on the cross-bar E revolves a short shaft, L, which carries at its forward end a bevel gear-wheel, M, which meshes with a bevel-gear, N, on the shaft J.

At the rear end of the shaft L is fixed a crank-disk, O, which connects by its pin $o$ with a pitman, P, which extends sidewise to connect pivotally by a pin, $q$, with any one of a series of holes, $q'$, in a lever, Q, which lever is pivoted at $q^2$ to projections from one of the seed-boxes B, and connects at its lower end at $r$ with the seed-dropping slide R, which is fitted to move transversely beneath both the seed-boxes B B, and is provided with suitable seed receiving and dropping apertures. The gearing is so arranged that one hill of seed will be dropped from each box B at every quarter-revolution of either forked wheel I by the drop-cord, the seed being planted in two parallel rows at each passage of the machine across the field. By setting the pitman-pin $q$ in different holes $q'$ the throw of the dropping-slide will be varied to deliver more or less seed to each hill, as desired.

In order to prevent slipping around of the forked operating-wheels I and consequent shifting of the dropping-slide by the momentum or backlash of the gearing, which would not allow a dropping of the seed in accurate check-row, I fix upon the shaft J the brake or friction wheel S, and to the cross-bar E, I fix the lower end of a spring-brake bar, T, which is then bent upward and forward, so that its forward end comes above the brake-wheel S. A bolt, U, passes down through the bar T forward of its bend and into the cross-bar E, and by screwing the nut $u$ along the bolt up or down the brake-shoe $t$ on the end of the bar will be pressed onto the brake-wheel S with more or less force, as may be required to hold the shaft J and its forked operating-wheels I against moving around either way after they have been carried partly around by the passage of each knot of the drop-cord K, and thereby insuring the dropping of the seed in accurate check-row.

Any desired suitable kind of rope or wire K may be used.

By disconnecting the pitman P from the lever Q, the lever may be worked by hand to drop the seed from both the seed-boxes at once.

Having thus described my invention, what I claim as new, and desire to secure by Letters Patent, is—

1. The combination, in a check-row corn-planter, of the frame-bar E and the shaft J, carrying the forked wheel I and bevel-gear N, for operating the seed-dropping slide and friction-disk S, with the bowed spring-brake T, secured to bar E, bolt U, passing through the bowed end of said spring, and a nut, *u*, for adjusting the said spring, substantially as set forth.

2. The combination, with the seed-dropping slide, of a check-row corn-planter, of the frame-bar E, end bars F F, shaft J, extending through bars F F, and provided with a bevel-gear, N, for operating the seed-slide mechanism, forked wheels I on the opposite ends of said shaft, friction-disk S, also on said shaft, guide-rollers G, mounted on inclined axes in front of the forked wheels, guide-wheels H, mounted on horizontal axes in rear of the said forked wheels, a bowed spring brake-lever, T, having a shoe, *t*, the bolt U, passing through the bowed end of the spring, and a nut, *u*, on the bolt, for adjusting said spring.

JOEL KIRKWOOD.

Witnesses:
GEO. W. YOUNG,
JAMES R. KIRKWOOD.